(12) United States Patent
Broussard et al.

(10) Patent No.: US 7,925,661 B2
(45) Date of Patent: Apr. 12, 2011

(54) METHOD AND SYSTEM FOR INFORMATION PROCESSING USING META-ARCHIVES

(75) Inventors: Scott J. Broussard, Cedar Park, TX (US); Ying Liu, Austin, TX (US); Eduardo N. Spring, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1076 days.

(21) Appl. No.: 10/185,684

(22) Filed: Jun. 27, 2002

(65) Prior Publication Data

US 2004/0003011 A1 Jan. 1, 2004

(51) Int. Cl.
*G06F 17/30* (2006.01)
*G06F 7/00* (2006.01)

(52) U.S. Cl. ........................ 707/769; 707/803

(58) Field of Classification Search .................. 707/200, 707/100, 104.1, 802, 769, 803
See application file for complete search history.

(56) References Cited

U.S. PATENT DOCUMENTS

| | | | | |
|---|---|---|---|---|
| 6,148,340 A | * | 11/2000 | Bittinger et al. | 709/224 |
| 6,161,107 A | * | 12/2000 | Stern | 707/104.1 |
| 6,272,641 B1 | * | 8/2001 | Ji | 726/24 |
| 2002/0147735 A1 | * | 10/2002 | Nir | 707/200 |
| 2003/0074360 A1 | * | 4/2003 | Chen et al. | 707/100 |
| 2003/0182626 A1 | * | 9/2003 | Davidov et al. | 715/513 |

OTHER PUBLICATIONS

"Jigsaw Activity Statement", W3C, http://www.w3.org/Jigsaw/Activity.html, Apr. 11, 2002.
Sundsted, "Zip your data and improve the performance of your network-based applications", *JavaWorld*, http://www.javaworld.com/javaworld/jw-11-1998/jw-11-howto.html, Nov. 1, 1998.
Gibbon, "Java Tip 83: Use filters to access resources in Java archives", http://www.javaworld.com/javaworld/javatips/jw-javatip83.html, Dec. 29, 1999.
Mitchell et al., "Java Tip 49: How to extract Java resources from JAR and zip archives", http://www.javaworld.com/javaworld/javatips/jw-javatip83.html, Mar. 1, 1998.
"Files Available for Download", expresso4-02-javadoc.jar, www.jcorporate.com, Mar. 17, 2002.
"ZipMagic® 4.0", http://www.ontrack.com/zipmagic, 2001.
"BackStreet Browser—v2.8", http://www.spadixbd.com/backstreet/index.html, unknown date.
"Wishlist", http://www.mozdev.org/wishlist.html, Apr. 13, 2001 to Jun. 11, 2002.
"ZeeProxy", http://www.geocities.com/elifarley/zeeproxy/, Apr. 11, 2002.

(Continued)

*Primary Examiner* — Kuen S Lu
(74) *Attorney, Agent, or Firm* — Hamilton & Terrile, LLP; Michael Rocco Cannatti (57) ABSTRACT

A method, system, apparatus, and computer program product are presented for a meta-archive information server that provides a set of operations or services for obtaining information from a meta-archive; these operations may include dynamic indexing, searching, comparing, or other operations. A meta-archive is a set of one or more archive files that are logically grouped in (or otherwise associated with) a container object, e.g., a file system folder, a directory, or another archive file. By allowing a user to derive sets of information from an entire meta-archive, a user can maintain more files within archives, thereby reducing file system disorganization. The meta-archive information server can be easily run over a specific meta-archive when necessary, thereby generating information dynamically, even if the archive files within a meta-archive change over time.

6 Claims, 7 Drawing Sheets

OTHER PUBLICATIONS

"JavaDoc Tool Home Page", http://java.sun.com/j2se/javadoc, Jun. 21, 2002.

"Java Servlet Technology", http://java.sun.com/products/servlet/index.html, Jun. 12, 2002.

"Lesson: Using JAR Files: The Basics", http://java.sun.com/docs/books/tutorial/jar/basics/index.html, 1995-2002.

"Jar—The Java Archive Tool", http://java.sun.com/products/jdk/1.1/docs/tooldocs/win32/jar.html, Jan. 2001.

"JAR Guide", http://java.sun.com/products/jdk/1.1/docs/guide/jar/jarGuide.html.

"java.net Class JarURLConnection", http://java.sun.com/products/jdk/1.2/docs/api/java/net/JarURLConnection.html, 1993-1999.

"JAR File Specification", http://java.sun.com/j2se/1.4/docs/guide/jar/jar.html, Jan. 1999.

* cited by examiner

METHOD AND SYSTEM FOR INFORMATION PROCESSING USING META-ARCHIVES

BACKGROUND OF THE INVENTION

1. Field of the Invention

The present invention relates to an improved data processing system and, in particular, to a method and apparatus for data file and information storage.

2. Description of Related Art

The amount of data that is stored on worldwide computer systems has been growing exponentially for many years, mainly because of the rapid reduction in the cost of permanent storage media. Larger storage capacities have allowed software vendors to develop larger applications such that enterprise applications typically require many thousands of files while consumer applications typically require many hundreds of files. Given the expansive storage capabilities of an average computer system, the average user tends to keep unnecessary applications and data files rather than deleting them, and the file systems of most computers continue to increase in size over time. File system disorganization within a typical computer system has been exacerbated by access to corporate networks and the Internet. With the ability to easily exchange and download files, the average user tends to collect files that are seldomly used.

In some operational environments, such as data collection systems associated with oil exploration instruments, large amounts of data are stored in relatively few files. In most computer systems, however, the average size of a data file is relatively small, and typical file systems can become cluttered with numerous files. Although the hierarchical nature of file systems provides a mechanism for instilling order to file maintenance, it can be quite difficult to maintain order of one's file system in many instances.

File system disorganization can be relieved through the use of archive files, which allow users to package many files into a single file while maintaining the logical, hierarchical associations between the constituent files. Users can maintain less numerous archive files more easily than their more numerous constituent files, and the mental burden on users for tracking their own files is greatly reduced.

In addition, the transmission or receipt of a single archive file is easier than the transfer of numerous files that could be placed into a single archive file. This advantage is significant with respect to the frequent exchange of files through the Internet, particularly when a downloaded archive file can be maintained on the end-user's computer system as a single file rather than numerous unpackaged files.

However, the packaging of files into an archive file has at least one significant disadvantage in that information about the archive file's constituent files is hidden from a user's view. In order to provide a user with helpful information about the constituent files within an archive file, applications that manipulate archive files typically provide a user with a list of constituent files and a graphical representation of the hierarchical organization of the constituent files in an archive file. The persistent use of numerous archive files, though, creates a form of information veil opposed to user access.

Therefore, it would be advantageous to provide a method and system for allowing a user to initiate informational operations on archive files.

SUMMARY OF THE INVENTION

A method, system, apparatus, and computer program product are presented for a meta-archive information server that provides a set of operations or services for obtaining information from a meta-archive; these operations may include dynamic indexing, searching, comparing, or other operations. A meta-archive is a set of one or more archive files that are logically grouped in (or otherwise associated with) a container object, e.g., a file system folder, a directory, or another archive file. By allowing a user to derive sets of information from an entire meta-archive, a user can maintain more files within archives, thereby reducing file system disorganization. The meta-archive information server can be easily run over a specific meta-archive when necessary, thereby generating information dynamically, even if the archive files within a meta-archive change over time.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 3A depicts a meta-archive information server in the form of a plug-in;

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
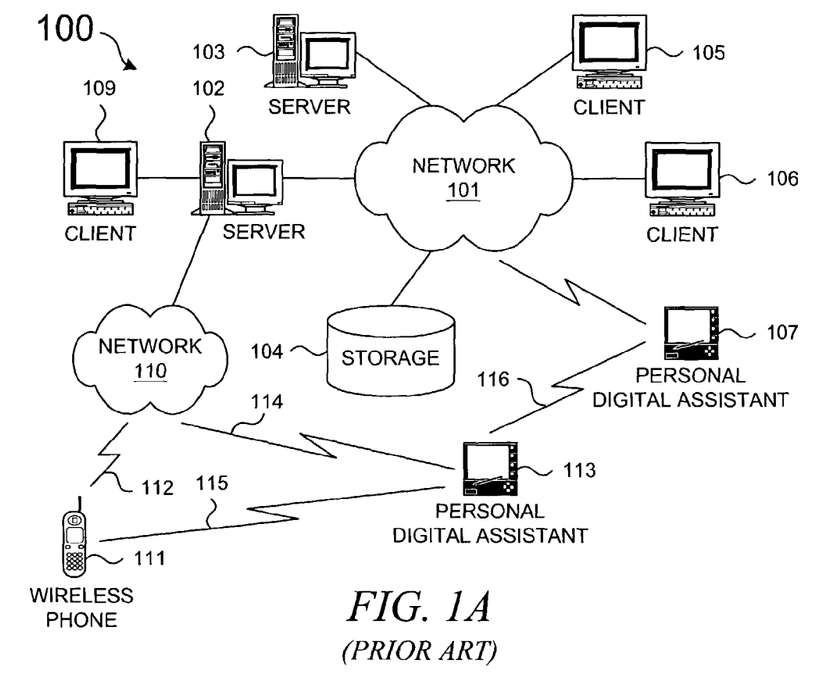
FIG. 1A depicts a typical distributed data processing system in which the present invention may be implemented.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
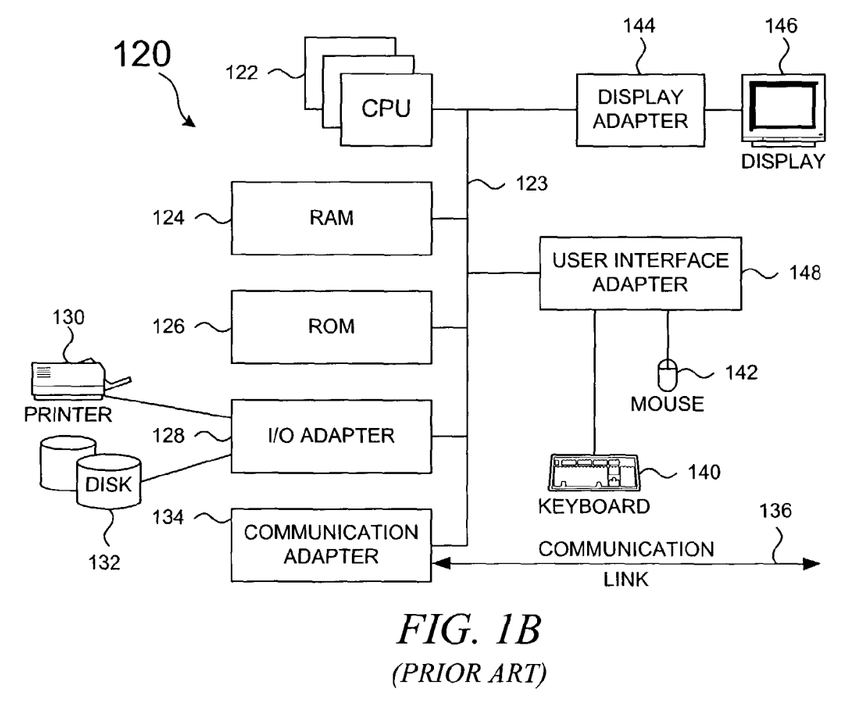
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have multiple processors, such as Intel® Pentium®-based processors and digital signal processors (DSP), and one or more types of volatile and non-volatile memory. Other peripheral devices may be used in addition to or in place of the hardware depicted in FIG. 1B. In other words, one of ordinary skill in the art would not expect to find identical components or architectures within a Web-enabled or network-enabled phone and a fully featured desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device may contain a simple Java® runtime environment.

The present invention may be implemented on a variety of hardware and software platforms, as described above. More specifically, though, the present invention is directed to a technique for serving information from archive files. The technique of the present invention is described in more detail with respect to the remaining figures.

Figure 2:
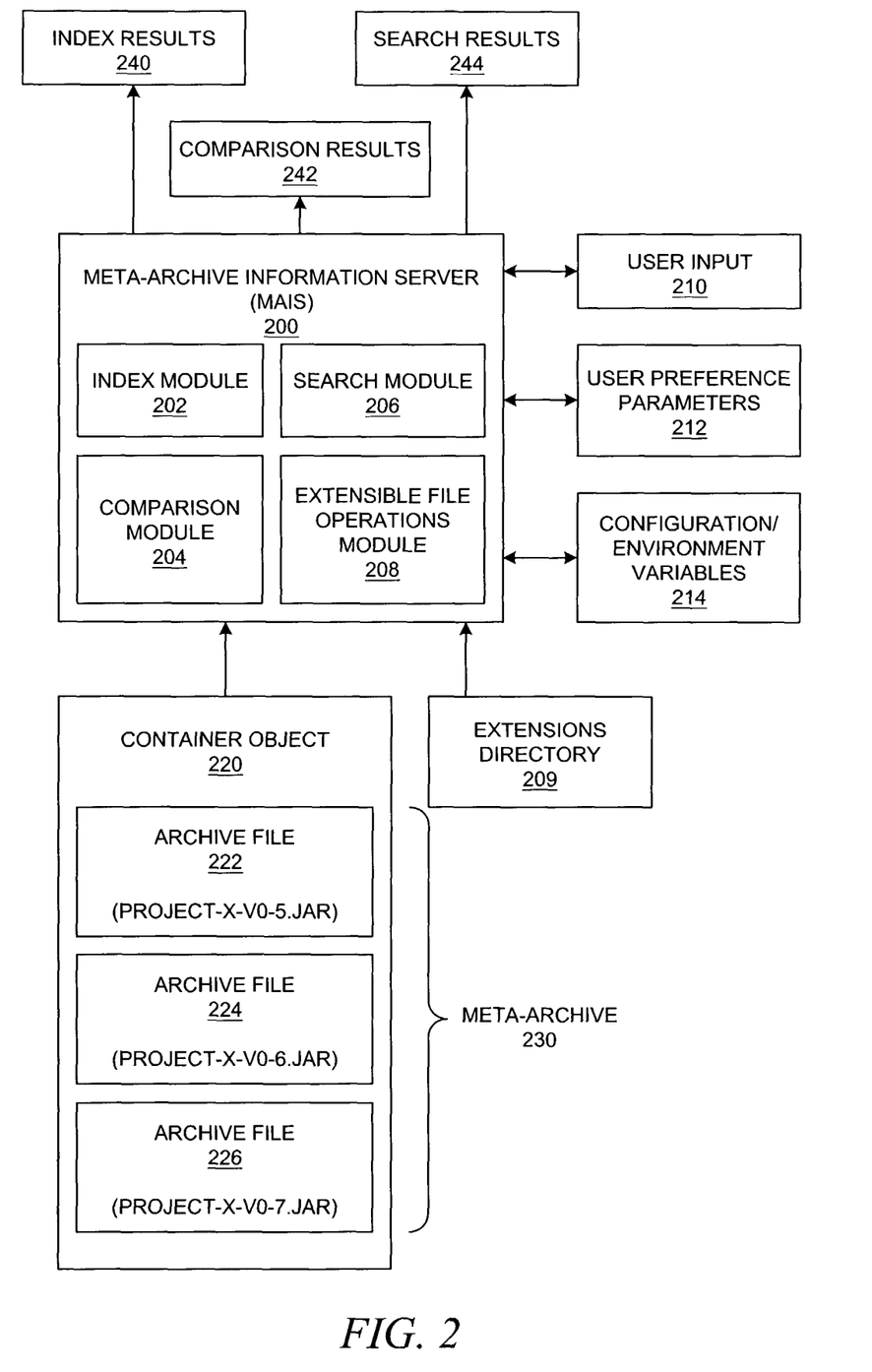
FIG. 2 depicts a meta-archive information server in accordance with the present invention.

With reference now to FIG. 2, a block diagram depicts a meta-archive information server in accordance with the present invention. Meta-archive information server (MAIS) 200 comprises a set of operational modules that generate specific types of information with respect to a meta-archive when MAIS 200 receives a specific request for the information. A meta-archive is a set of one or more archive files that are logically grouped in (or otherwise associated with) a container object, e.g., a file system folder, a directory, or another archive file. A meta-archive information server provides a set of operations or services for dynamically obtaining information from a meta-archive; these operations may include dynamic indexing, searching, comparing, or other operations. Hence, MAIS 200 comprises modules, i.e., routines, classes, subprograms, or other functional entities, that accomplish the services that are provided by MAIS 200 in response to external requests.

Index module 202 generates various types of indices over a set of archive files in a meta-archive. Comparison module 204 compares one or more archive files for differences and/or similarities within the content of the archive files. Search module 206 performs various types of searches through a meta-archive, such as a search for terms, classes, methods, or other information. Other modules for supporting other types of information requests could be included in the MAIS, and the examples shown in FIG. 2 should not be interpreted as limiting the types of modules that could be included in the MAIS.

Extensible file operations module 208 provides for the execution of pluggable information serving modules that may be found within extensions directory 209 within an archive file. In this manner, an archive file can be enhanced by modifying the archive file to include a set of classes that perform an information-serving operation that is not provided by MAIS 200 but is supported by MAIS 200 through integration with the other information-serving operations that are provided by MAIS 200.

MAIS 200 may be guided in its information-serving operations through a variety of optional input means. User input 210 may be directly entered into MAIS 200 through user interface controls that are provided by MAIS 200. User input 210 may also be extracted from meta-archive information request messages that are received by MAIS 200. MAIS 200 may maintain user preference parameters 212 in an internal database or other appropriate location, thereby allowing a user to specify operational parameters on a permanent basis so that the user does not need to re-specify certain parameters with each meta-archive information request. MAIS 200 may be retrieve configuration parameters or environment variables that allow administrative control over the operational behavior of MAIS 200.

When MAIS 200 receives a meta-archive information request, MAIS 200 retrieves an identifier of container object 220, which may be a file folder, file directory, or similar computer file subsystem container object for logically grouping a set of files, including archive files. The identifier may be obtained from the request itself, from user input 210, from user preference parameters 212, from configuration/environment variables 214, or from some other source. In the example in FIG. 2, container 220 holds archive files 222, 224, and 226; this logical group of three archive files represents an example of a meta-archive, i.e., meta-archive 230. The archive files in FIG. 2 are ".jar" or JAR files, i.e., Java™ ARchive files. Other types of archive files are supportable by the present invention, such as ".zip" files, ".gar" files, etc., and the present invention is operable in the presence of other common archive file features, such as compression, security codings, etc.

In order to satisfy the original request, MAIS 200 generates index results 240, comparison results 242, search results 244, or some other type of results, as necessary, and returns the results to the requesting entity.

Figure 3A:
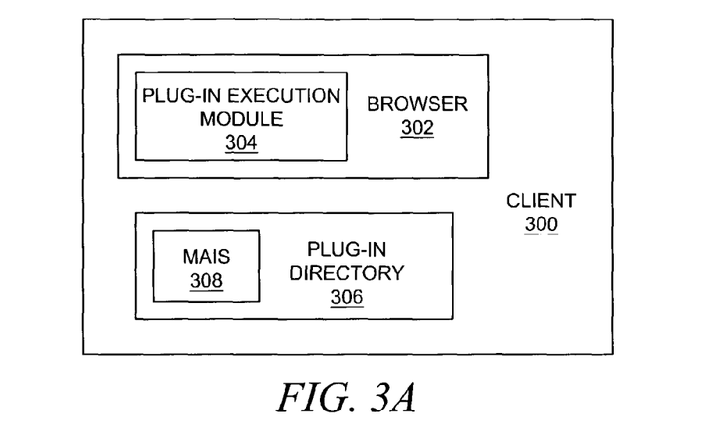

With reference now to FIG. 3A, a block diagram depicts a meta-archive information server in the form of a plug-in. Client 300 supports browser application 302, which in turn supports plug-in execution module 304. As is well-known in the art, plug-in execution module 304 may be a Java™ virtual machine. Through an appropriate application-related parameter, browser 302 is configured to search for available plug-ins within plug-in directory 306. In this example, MAIS 308 is available for execution as a plug-in when necessary, e.g., a user request through the graphical user interface that is provided by the browser application.

Figure 3B:
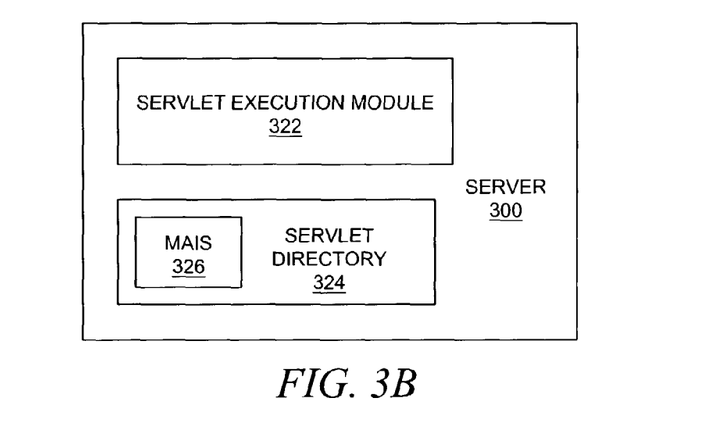
FIG. 3B depicts a meta-archive information server in the form of a servlet.

With reference now to FIG. 3B, a block diagram depicts a meta-archive information server in the form of a servlet. Server 300 supports servlet execution module 322, and in a manner similar to FIG. 3A, servlet execution module 322 is configured to search for available servlets in servlet directory 324 as indicated by an appropriate environment variable or similar parameter. In this example, MAIS 326 is available for execution as a servlet when necessary, such as when a request message is received that indicates that the services provided by MAIS 326 are needed, e.g., an HTTP request message with a meta-archive request parameter and a URL that might identify a meta-archive on server 300.

It should be noted that the exemplary implementations that are shown in FIG. 3A and FIG. 3B do not imply limitations on the form of execution of MAIS 200. As additional examples, MAIS 200 may be implemented as a stand-alone application, or MAIS 200 may be incorporated into other types of applications, such as archive file utility applications or archive file generation applications.

Figure 4:
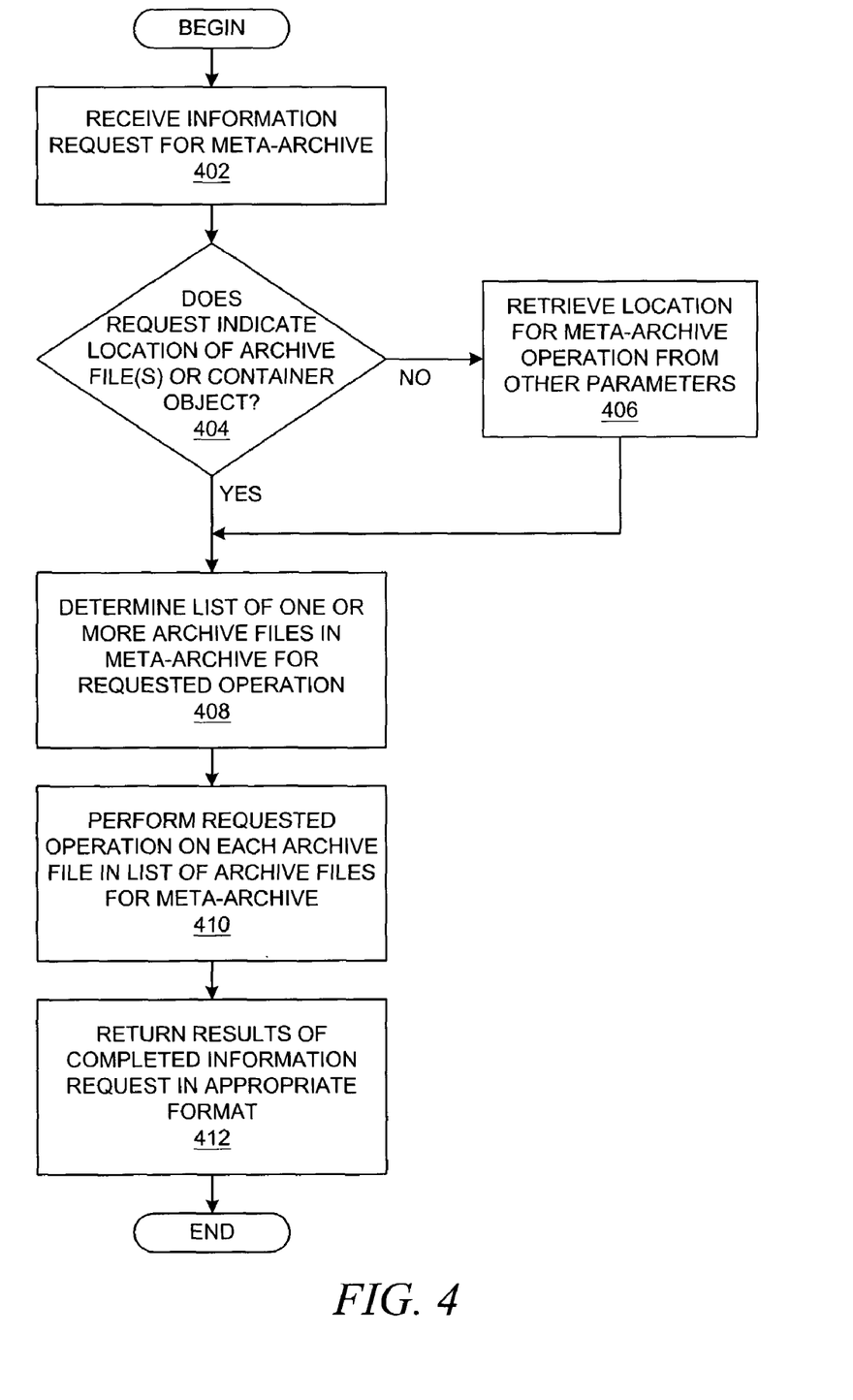
FIG. 4 depicts a process by which a meta-archive information server compiles information from a set of archive files.

With reference now to FIG. 4, a flowchart depicts a process by which a meta-archive information server (MAIS) compiles information from a set of archive files. The process begins when the MAIS receives an information request (step 402), which may be received in the form of a message, a command, or other some other form of input. As mentioned above, the MAIS provides a set of operations or services for dynamically obtaining information from a meta-archive, such as indexing and searching. When the MAIS receives a meta-archive request, the MAIS dynamically discovers which archive files should be accessed to fulfill the request. Hence, a determination is made as to whether the request itself indicates the location of a set of archive files or a container object that holds a set of archive files (step 404). If not, then the MAIS retrieves a meta-archive location identifier from some other form of available input (step 406), such as those shown in FIG. 2.

After determining an intended location for the meta-archive, the MAIS determines a list of one or more archive files that comprise the meta-archive to be used to satisfy the meta-archive information request (step 408). The MAIS then performs the requested operation on each archive file in the list of files that was previously determined to comprise the meta-archive (step 410). The MAIS returns the generated results of the completed information gathering operation in an appropriate format to the requester (step 412), and the process is complete.

The format of the result data may depend upon the form in which the request was received, the form in which the MAIS is executing, or some combination of these or other criteria. For example, if the MAIS is executing as a servlet, and the original request was received within an HTTP request message, then the MAIS would likely return an HTTP response message to the requesting entity. The format of the content or payload within the HTTP response message may vary, e.g., the MAIS may generate an XML-formatted or HTML-formatted document.

Figure 5A:
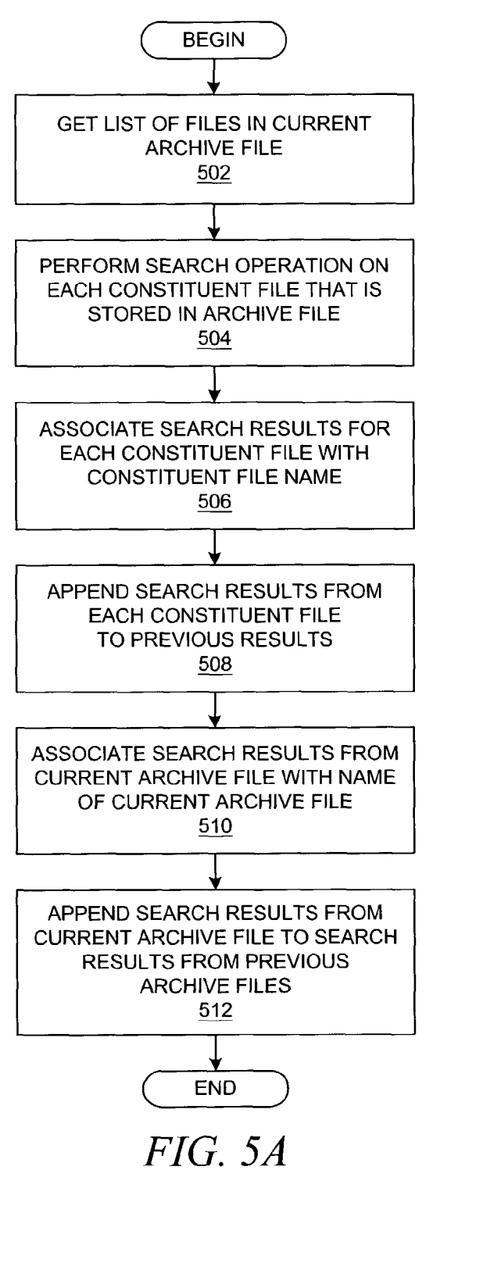
FIG. 5A depicts a process by which a search operation is conducted on a meta-archive.
Figure 5B:
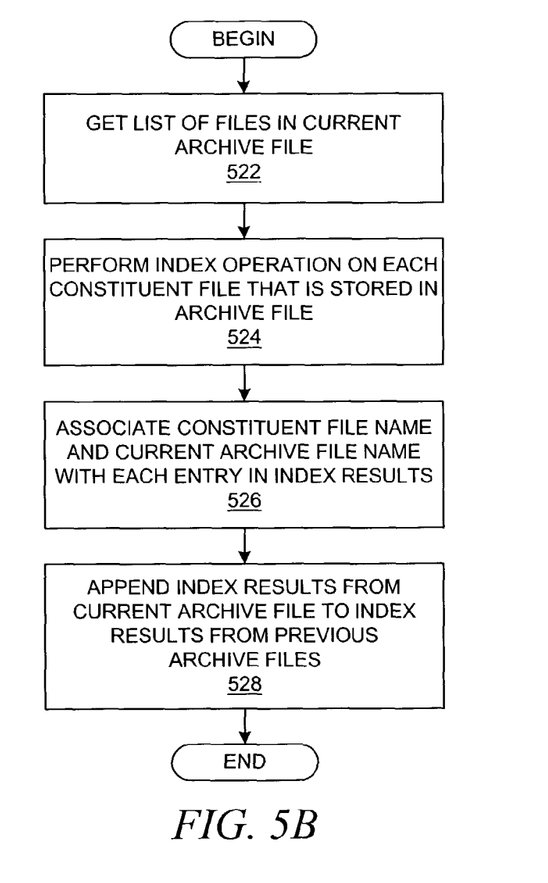
FIG. 5B depicts a process by which an index operation is conducted on a meta-archive.
Figure 5C:
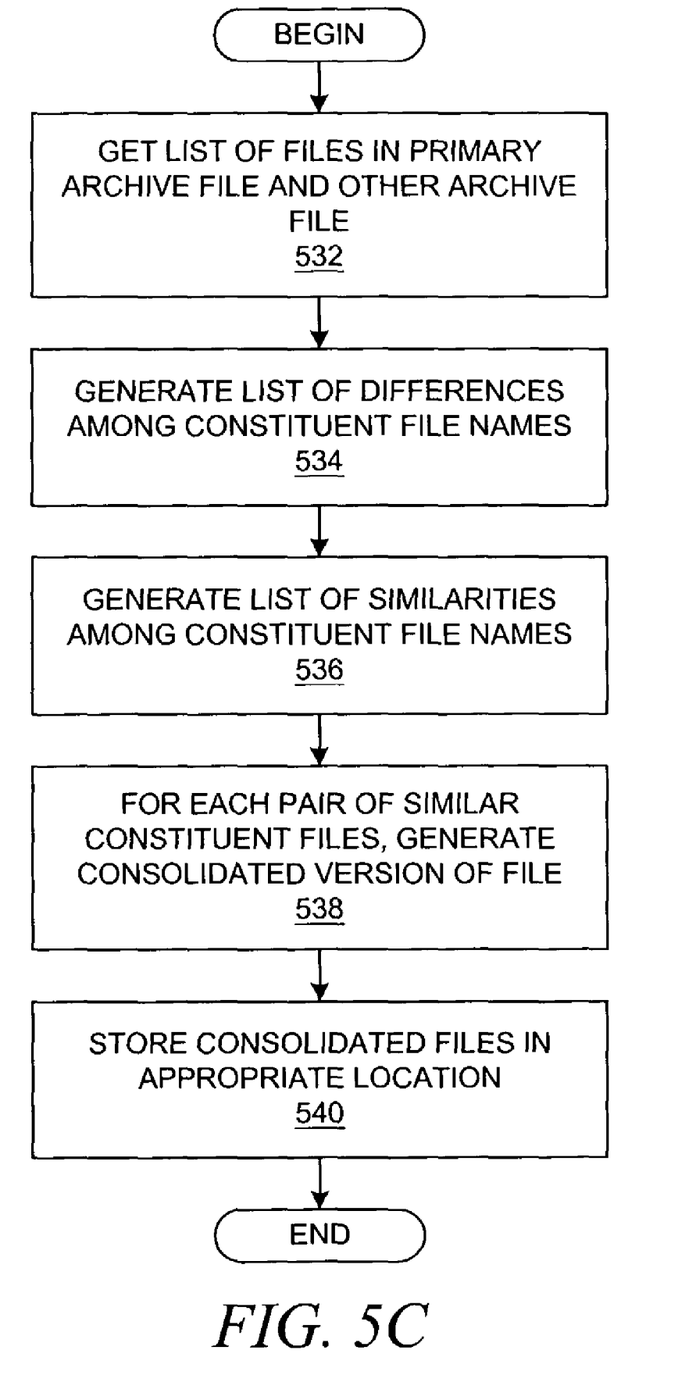
FIG. 5C depicts a process by which a comparison operation is conducted on a meta-archive.

FIGS. 5A-5C show the processing that is performed by an instance of a meta-archive information server in response to a single request for information with respect to a single archive file in the list of archive files comprising the meta-archive. In other words, FIG. 4 shows that the MAIS first determines a list of archive files in the meta-archive and then performs the requested information-gathering operation on each archive file in this list. As the requested operation is completed on a particular archive file, the results with respect to that particular archive file are compiled into the results that were previously generated for other archive files in the meta-archive. FIGS. 5A-5C provide further detail of examples of processing that may occur with respect to each archive file as the MAIS increments through the list of archive files in the meta-archive, i.e., further detail for step 410 in FIG. 4. It should be noted that although FIGS. 5A-5C depict the processing of three different types of information requests, other information requests may be supported by the MAIS, as mentioned above with respect to FIG. 2. Moreover, the search, index, and comparison operations that are shown in FIGS. 5A-5C are meant as examples of uses for the present invention and should not be interpreted as limiting the manner in which the present invention may be used in conjunction with search, index, and comparison operations on a meta-archive.

With reference now to FIG. 5A, a flowchart depicts a process by which a search operation is conducted on a meta-archive. The process begins with the MAIS obtaining a list of constituent files within the archive file that is currently being processed, i.e., the "current" archive file (step 502), and the MAIS would step through this list of files or use this list as a guide to the file entries within the archive file.

The requested search operation is performed on each constituent file that is stored in the current archive file (step 504). In order to provide some form of accounting information or tracking information so that the user can identify the source of an entry within the search results, the name of the constituent file is associated with the search results that were derived from the constituent file (step 506), and the search results are appended to the previous search result data or otherwise merged with the previous search result data (step 508). After completing the search operation with respect to each constituent file, the name of the current archive file may be associated with the search result data that was derived from the current archive file, again for accounting or tracking purposes (step 510). The search results for the current archive file are then appended to or otherwise merged with the search results from other archive files in the meta-archive (step 512), and the process is complete.

With reference now to FIG. 5B, a flowchart depicts a process by which an index operation is conducted on a meta-archive. Different types of indices may be requested or generated, such as an index of terms, classes, methods, cross-reference indices, or other information. The meta-archive information request may comprise some type of indicator as to the type of index that is being requested.

In a manner similar to that described above with respect to FIG. 5A, the process begins with the MAIS obtaining a list of constituent files within the archive file that is currently being processed, i.e., the "current" archive file (step 522), and the MAIS would step through this list of files or use this list as a guide to the file entries within the archive file. The requested index operation is performed on each constituent file that is stored in the current archive file (step 524), either individually or together as a group. For tracking or accounting purposes, the names of the constituent file and the current archive file are associated with the index results (step 526). The index results are then appended to the previous index result data or otherwise merged with the previous index result data (step 528), and the process is complete.

With reference now to FIG. 5C, a flowchart depicts a process by which a comparison operation is conducted on a meta-archive. The process begins with the MAIS obtaining a list of constituent files within two archive files that are currently being compared (step 532). Although the example in FIG. 5C depicts the comparison of two archive files from a meta-archive, multiple archive files may be compared in response to a comparison operation if there are more than two archive files in the meta-archive. For example, the comparison request may indicate a "primary" archive file that is to be used as the basis of comparison, and all other archive files are compared to the primary archive file, thereby generating a set of results that are focused on a particular archive file. Alternatively, each archive file may be compared with each other archive file in the meta-archive, thereby generating a set of very detailed results.

The MAIS then generates a list of differences among the constituent file names of the two archive files that are being compared (step 534) along with a list of similar constituent file names (step 536). In this example, only file names that are identical or substantially similar are assumed to contain similar content. Different file names are assumed to contain content that is not similar to any other constituent file. Hence, only files with potentially similar content are compared. Alternatively, an analysis could be performed on each file to determine its content, such as the frequency of specific words, statements, or phrases, and files with similar analysis results could be compared against one another.

For each pair of files that are deemed by the MAIS to potentially contain similar content, the MAIS generates a consolidated version of the pair of files (step 538). The manner in which the differences and similarities in a pair of files are reported may vary with the implementation of the present invention. In this example, a consolidated version of the pair of files is generated. After the consolidated version (or versions) has been created, it is stored or returned in an appropriate manner (step 540), and the process is complete.

In a manner that is well-known in the art, a consolidated version of two files can be generated by considering a first file in the pair of files to be the basis of comparison; generally, the file with the older creation or modification date is used as the basis of comparison. The consolidated version begins as a copy of the first file. Content that is contained in the second file but not in the first file is considered to be added content, and this added content is then inserted into the consolidated version with appropriate mark-up indications to show that it is added or new content, e.g., by underlining the new content. Content that is contained in the first file but not in the second file is considered to have been deleted in the second file, and this deleted content is marked-up in the consolidated version with appropriate mark-up indications to show that it has been deleted, e.g., by striking-out the deleted content.

Figure 6:
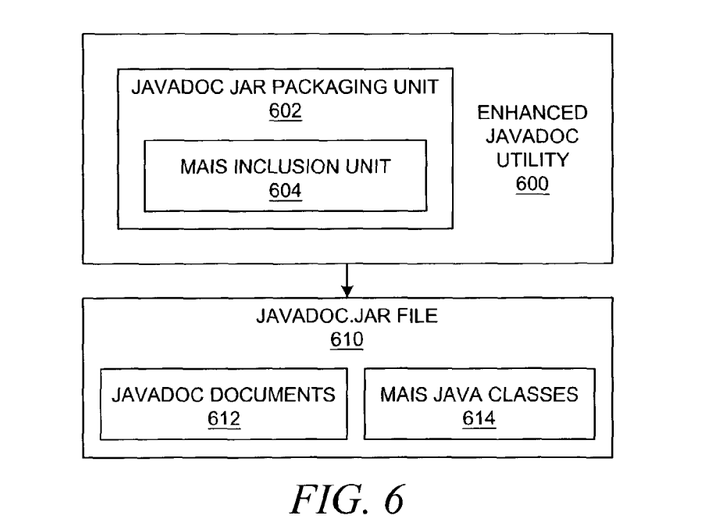
FIG. 6 depicts an enhanced Javadoc utility that is able to generate Java™ ARchive (JAR) files containing Java™ classes for a meta-archive information server.

With reference now to FIG. 6, a block diagram depicts an enhanced Javadoc utility that is able to generate JAR files containing Java™ classes for a meta-archive information server. As is well-known in the art, Javadoc is a tool from Sun Microsystems, Inc., for generating application programming interface (API) documentation in HTML format from "doc" comments in Java™ source code. When a software developer wants to generate the source code documentation, the software developer runs the Javadoc tool over the source code to parse the "doc" comments, thereafter generating a set of HTML documents that are hyperlinked to each other.

FIG. 6 depicts a manner in which an instance of a Javadoc application could be enhanced to comprise an embodiment of the present invention, shown as enhanced Javadoc utility 600. As a first modification, enhanced Javadoc utility 600 comprises Javadoc JAR packaging unit 602 such that, as a user option, the enhanced Javadoc utility 600 stores the generated Javadoc HTML documents into a single ".jar" file, thereby packaging an application's documentation into a single file for ease of storage and transfer. In addition, enhanced Javadoc utility 600 comprises MAIS inclusion unit 604 for including, as a user option, an instance of a meta-archive information server in any generated archive files, such as "javadoc.jar" file 610, along with typical Javadoc documents 612. In this example, MAIS inclusion unit 604 has inserted a meta-archive information server, e.g., similar to those described above with respect to FIG. 2 and FIGS. 4-5C, in the form of MAIS Java™ classes 614 that can be executed to perform the MAIS functionality. If desired, archive file 610 can be processed so that it is a runnable ".jar" file.

As an option, the MAIS functionality can be tailored to the type of documents or domain information with which it has been packaged so that it includes document-specific or domain-specific functionality. In other words, the meta-archive information request operation software can be enhanced with document-specific or domain-specific behavior. For example, a set of medical documents may be included with special medical-term, fuzzy-logic searching functionality, whereas a set of auto-parts documents may be included with different fuzzy-logic searching functionality.

Figure 7:
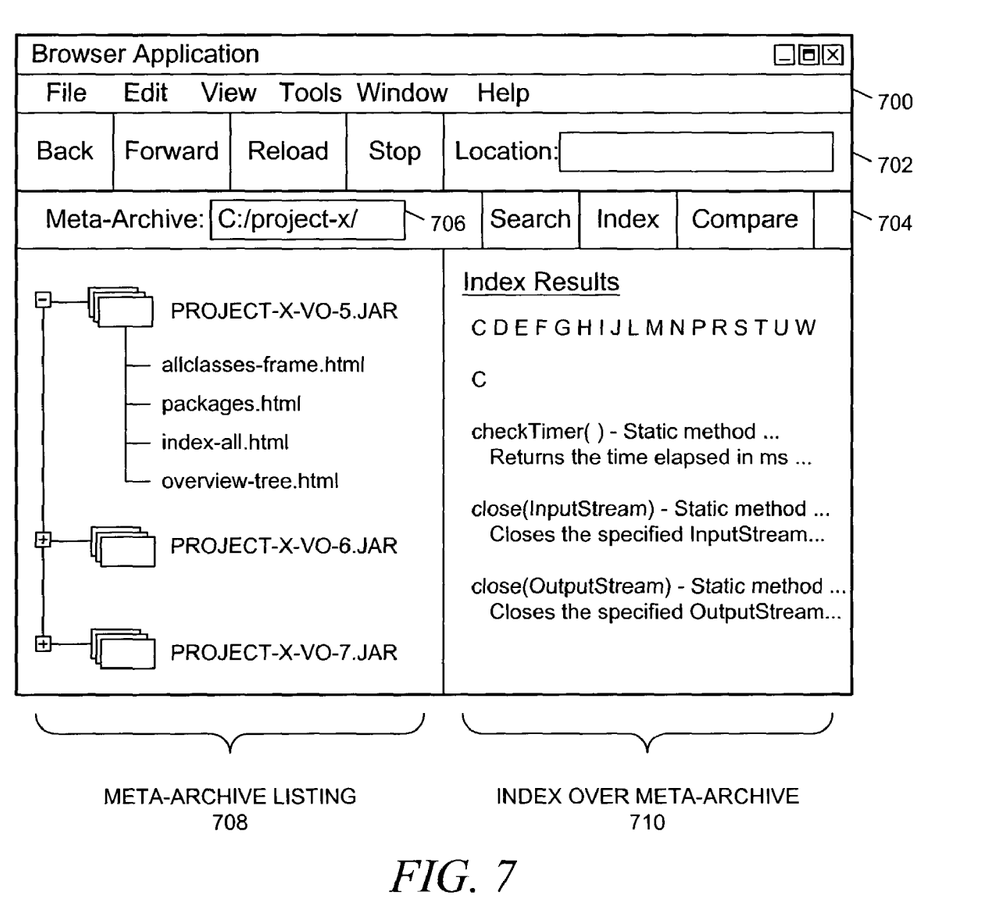
FIG. 7 depicts a graphical user interface window that contains a meta-archive information server that executes as a plug-in within a browser application.

With reference now to FIG. 7, a graphical user interface window depicts a meta-archive information server that executes as a plug-in within a browser application. Window 700 is a browser application window that contains typical browser toolbar 702. In this example, toolbar 704 is associated with a meta-archive information server. Meta-archive toolbar 704 has text entry field 706 for entering the location of a set of archive files that are to be manipulated as a meta-archive. Alternatively, the meta-archive location could be input through other mechanisms, as shown in FIG. 2.

As another alternative, if the meta-archive information server was launched through the execution of Java™ classes in a ".jar" file, as shown in FIG. 6, then the location of the ".jar" file could be used as the location of the meta-archive, thereby allowing a MAIS within a ".jar" file to be used to inspect ".jar" files within the same directory. In other words, when the MAIS within a ".jar" file is activated, it will determine the identity of other ".jar" files in the same container, usually on the same local device but possibly on a remote device, thereby associating itself with other ".jar" files for the purpose of extracting common information from all of those ".jar" files as a meta-archive.

Toolbar 704 also comprises toolbar buttons for each available type of information request that can be run against a meta-archive. In this example, a user could request a search operation, an index operation, and a compare operation, all of which have associated function modules as shown in FIG. 2. If some operational extensions were available, as described with respect to FIG. 2, then buttons could be presented to the user for selection of those choices.

Using well-known file hierarchy presentation techniques, window frame 708 contains a file listing that shows the archive files within a container; a user may optionally view the constituent files within the archive files. Using the present invention, the archive files are associated with each other as a meta-archive, and information can be compiled from the meta-archive as a whole using the meta-archive information server's available operations.

Window frame 710 contains an index of classes that have been compiled from all of the archive files within the current meta-archive in response to a user request to compile the request, which may be initiated by a user selecting the "Index" button on the meta-archive toolbar. If necessary, when the index button is selected on the meta-archive toolbar, a dialog box may be presented to the user to enter various options, such as the type of index to be created, e.g., alphabetical, reverse-alphabetical, word index, class index, etc. Similar dialog boxes for the options associated with other meta-archive information requests could be presented when necessary.

The advantages of the present invention should be apparent in view of the detailed description that is provided above. The present invention overcomes some of the difficulties in working with archive files. Although archive files are convenient for storing and transferring information, they present an information veil or information barrier that prevents a user from having easy access to the information stored within them.

The present invention is directed to a meta-archive information server that provides a set of operations or services for dynamically obtaining information from a meta-archive; these operations may include dynamic indexing, searching, comparing, or other operations. A meta-archive is a set of one or more archive files that are logically grouped in (or otherwise associated with) a container object, e.g., a file system folder, a directory, or another archive file. By allowing a user to derive sets of information from an entire meta-archive, a user can maintain more files within archives, thereby reducing file system disorganization. The meta-archive information server can be easily run over a specific meta-archive when necessary.

More importantly, the meta-archive information requests can be run dynamically against the meta-archive, even though the specific identity of the archive files within a meta-archive are not specifically identified in the information request. In this manner, the archive files within the meta-archive can change over time, yet one can still obtain desired information with respect to the meta-archive.

Referring again to FIG. 7, some specific advantages can be discussed with respect to the use of the present invention with ".jar" files and the Javadoc utility. The Javadoc utility generates an index of Java™ classes when it is run against a set of Java™ source code files. However, applications typically require the work of multiple people or groups, all of which may generate sets of Javadoc files. The present invention provides a mechanism in which a set of Javadoc documents can be packaged into an archive file, and then multiple archive files from different sources can be indexed together or searched together to find information. In addition, sets of Javadoc files could be compared against each other while maintaining the Javadoc files in packages, which is particularly advantageous when different versions of files are generated for updated source code. Given that the present invention can generate indices, search results, or other datasets in a dynamic manner, even though the archive files may be changing, a software developer has a useful tool for maintaining archive files, updating those archive files, yet still being able to glean information across multiple archive files.

It is important to note that while the present invention has been described in the context of a fully functioning data processing system, those of ordinary skill in the art will appreciate that some of the processes associated with the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for processing information from a set of archive files, the method comprising:
   receiving a request to obtain information derived from a set of archive files;
   in response to receiving the request, identifying a container with which the set of archive files are associated;
   determining an information operation specified by the request;
   performing the specified information operation with respect to each archive file in the set of archive files, wherein the specified information operation is selected from the group consisting of searching, indexing, and comparing; and
   generating a response to the request comprising information derived from the set of archive files and an identifier for an archive file and a constituent file therein which is associated with each information entry in the response to indicate an origin for the information entry.

2. The method of claim 1 further comprising:
   determining a list of constituent files in each archive file in the set of archive files; and
   performing the specified information operation with respect to each constituent file in each archive file in the set of archive files.

3. An apparatus for processing information from a set of archive files, the apparatus comprising a processor, a data bus coupled to the processor, and a memory coupled to the processor through the data bus for storing computer readable code to be processed by the processor for:
   receiving a request to obtain information derived from a set of archive files;
   identifying a container with which the set of archive files are associated in response to receiving the request;
   determining an information operation specified by the request;
   performing the specified information operation with respect to each archive file in the set of archive files, wherein the specified information operation is selected from the group consisting of searching, indexing, and comparing; and generating a response to the request comprising information derived from the set of archive files and an identifier for an archive file and a constituent file therein which is associated with each information entry in the response to indicate an origin for the information entry.

4. The apparatus of claim 3 further comprising computer readable code to be processed by the processor for:

determining a list of constituent files in each archive file in the set of archive files; and performing the specified information operation with respect to each constituent file in each archive file in the set of archive files.

5. A computer program product stored in a computer readable medium for use in a data processing system for processing information from a set of archive files, the computer program product comprising:

instructions for receiving a request to obtain information derived from a set of archive files;

instructions for identifying a container with which the set of archive files are associated in response to receiving the request;

instructions for determining an information operation specified by the request:

instructions for performing the specified information operation with respect to each archive file in the set of archive files, wherein the specified information operation is selected from the group consisting of searching, indexing, and comparing; and instructions for generating a response to the request comprising information derived from the set of archive files and an identifier for an archive file and a constituent file therein which is associated with each information entry in the response to indicate an origin for the information entry.

6. The computer program product of claim 5 further comprising:

instructions for determining a list of constituent files in each archive file in the set of archive files; and instructions for performing the specified information operation with respect to each constituent file in each archive file in the set of archive files.

* * * * *